US008447748B2

(12) United States Patent
Lee et al.

(10) Patent No.: US 8,447,748 B2
(45) Date of Patent: May 21, 2013

(54) PROCESSING DIGITALLY HOSTED VOLUMES

(75) Inventors: Aileen Lee, San Jose, CA (US); Amar Chokhawala, Los Altos, CA (US); Rodney Chu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 886 days.

(21) Appl. No.: 12/172,072

(22) Filed: Jul. 11, 2008

(65) Prior Publication Data

US 2009/0019011 A1    Jan. 15, 2009

Related U.S. Application Data

(60) Provisional application No. 60/949,196, filed on Jul. 11, 2007.

(51) Int. Cl.
*G06F 17/30* (2006.01)

(52) U.S. Cl.
USPC ........................................................ 707/706

(58) Field of Classification Search
USPC ........................................................ 707/706
See application file for complete search history.

(56) References Cited

U.S. PATENT DOCUMENTS

| | | | |
|---|---|---|---|
| 5,553,216 A | 9/1996 | Yoshioka et al. | |
| 5,717,925 A | 2/1998 | Harper et al. | |
| 6,535,873 B1 * | 3/2003 | Fagan et al. | 707/706 |
| 6,684,204 B1 * | 1/2004 | Lal | 1/1 |
| 7,356,461 B1 * | 4/2008 | Tremblay et al. | 704/9 |
| 7,496,904 B2 * | 2/2009 | Srivastava et al. | 717/133 |
| 7,748,634 B1 * | 7/2010 | Zehr et al. | 235/492 |
| 7,792,789 B2 * | 9/2010 | Prahlad et al. | 707/608 |
| 2002/0087555 A1 * | 7/2002 | Murata | 707/10 |
| 2002/0152215 A1 * | 10/2002 | Clark et al. | 707/10 |
| 2005/0027740 A1 * | 2/2005 | Moritani et al. | 707/104.1 |
| 2005/0027742 A1 * | 2/2005 | Eichstaedt et al. | 707/104.1 |
| 2005/0131894 A1 * | 6/2005 | Vuong | 707/5 |
| 2005/0289452 A1 * | 12/2005 | Kashi et al. | 715/512 |
| 2006/0106874 A1 * | 5/2006 | Victor et al. | 707/104.1 |
| 2006/0149734 A1 * | 7/2006 | Egnor et al. | 707/7 |
| 2006/0159109 A1 * | 7/2006 | Lamkin et al. | 370/401 |
| 2006/0173828 A1 * | 8/2006 | Rosenberg | 707/3 |
| 2006/0235855 A1 * | 10/2006 | Rousseau et al. | 707/100 |

(Continued)

OTHER PUBLICATIONS

PCT International Search Report and Written Opinion, PCT/US2008/069856, Oct. 22, 2008, 9 pages.

(Continued)

*Primary Examiner* — Robert Beausoliel, Jr.
*Assistant Examiner* — Noosha Arjomandi
(74) *Attorney, Agent, or Firm* — Fenwick & West LLP

(57) ABSTRACT

A content specification containing a data structure describing a digital volume to be incorporated into a digital library is received. A digital volume is a digital representation of human-readable content, such as a digitized book. Volume content of the digital volume is obtained based on references in the content specification to the locations of the volume content. The volume content is indexed based at least in part on information in the content specification, including volume metadata such as the title or author of the volume. The content specification includes markup language elements, each element specifying information about the digital volume. A plurality of tags are associated with the markup language elements. A structural tag specifies structural information associated with the digital volume, including the location of a portion of volume content of the digital volume. A metadata tag specifies metadata describing or identifying the digital volume.

24 Claims, 5 Drawing Sheets

U.S. PATENT DOCUMENTS

| | | | |
|---|---|---|---|
| 2006/0248061 A1* | 11/2006 | Kulakow et al. | 707/3 |
| 2007/0073894 A1* | 3/2007 | Erickson et al. | 709/230 |
| 2007/0100829 A1* | 5/2007 | Allen et al. | 707/9 |
| 2007/0136320 A1 | 6/2007 | Sah et al. | |
| 2007/0237090 A1* | 10/2007 | Kim et al. | 370/252 |
| 2008/0052280 A1* | 2/2008 | France-Prouvoste | 707/3 |
| 2008/0082486 A1* | 4/2008 | Lermant et al. | 707/3 |
| 2008/0154951 A1* | 6/2008 | Martinez et al. | 707/103 Y |

OTHER PUBLICATIONS

Supplementary European Search Report for European Patent Application No. EP 08796169, Mar. 21, 2013, 7 pages.

* cited by examiner

PROCESSING DIGITALLY HOSTED VOLUMES

CROSS-REFERENCE TO RELATED APPLICATIONS

This application claims the benefit of U.S. Provisional Application No. 60/949,196, filed Jul. 11, 2007, which is hereby incorporated in its entirety by reference.

FIELD OF THE INVENTION

This invention relates generally to digitally hosted volumes, and more specifically to incorporating the volumes into a library of digital content.

BACKGROUND

Volumes can be digitally stored and hosted by a volume server, enabling the volumes to be easily searched and retrieved for viewing by users. Volumes include, for example, digitized books and magazines. The volumes are searched based on a user query, and the volumes that best match the query are displayed to the user.

The volumes can be crawled and indexed for inclusion in search results. While the content of a volume may be easily obtained by a crawler, it is often difficult to determine semantic information for the volume. For example, it is difficult to determine whether particular content (e.g., a page of a volume stored as a graphical image) is a table of contents, index, or synopsis. It is possible to use heuristics or machine learning techniques to obtain the semantic information, but such techniques can introduce errors that decrease the quality of the information and in turn decrease the quality of the search results provided to the user. Semantic information for the volume is also useful for other purposes, such as properly displaying the volume to users.

Accordingly, there is a need in the art for a way to better determine the semantic information of a digitally hosted volume for improved searching and display of the volume.

SUMMARY

The above need is met by a system, method, and computer program product for incorporating a digital volume into a digital library, enabling the volume to be searched and displayed. In an embodiment of the method, a content specification containing a data structure describing a digital volume is received. A digital volume is a digital representation of human-readable content, such as a digitized book or magazine. Volume content of the digital volume is obtained based on references in the content specification to locations of the volume content. The volume content is indexed based at least in part on information in the content specification, including volume metadata such as the title or author of the volume.

The content specification includes markup language elements, each element specifying information about the digital volume. A plurality of tags are associated with the markup language elements. A structural tag specifies structural information associated with the digital volume, including the location of a portion of volume content of the digital volume. A metadata tag specifies metadata describing the digital volume. There are also indexing tags for specifying indexing information and partner tags for specifying partner-specific information.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

Figure 1:
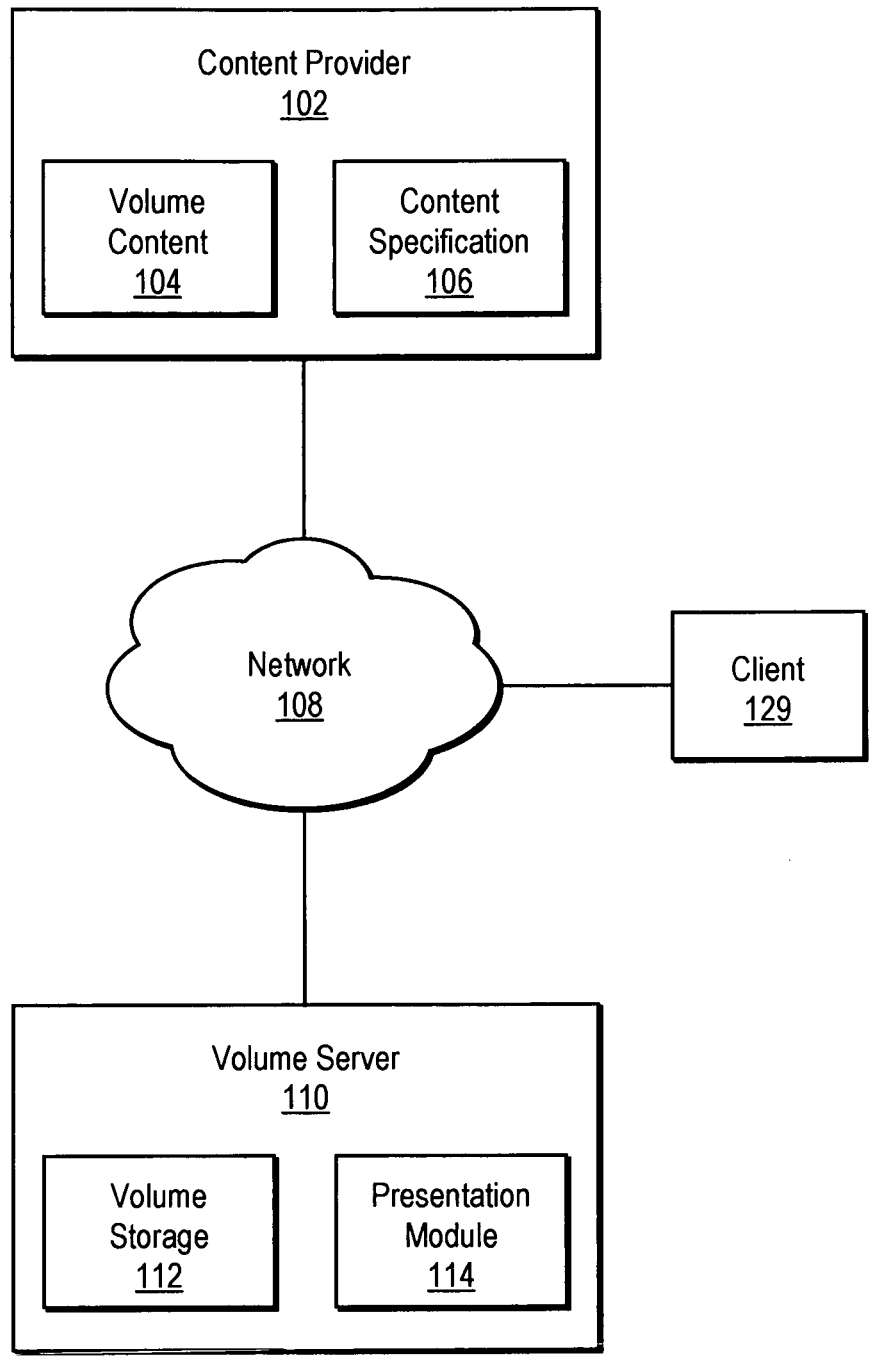
FIG. 1 is a high-level diagram illustrating an environment for incorporating digital volumes into a library of digital content, in one embodiment.

FIG. 1 is a high-level diagram illustrating an environment for incorporating digital volumes into a library of digital content, in one embodiment. The environment includes a content provider 102, a volume server 110, and a client 120. The content provider 102 provides to the volume server 110 volume content 104 and a content specification 106 corresponding to one or more volumes. A volume is a digital representation of human-readable content, such as a digitized book, a portion of a digitized book (e.g., a chapter), or a digitized magazine. The content specification 106 includes structural information and other data about the volume content 104.

The volume content 104 and content specification 106 are retrieved by the volume server 110 which processes these items, determines information about the volume, and indexes the volume content. The processed and indexed volume content 104 is stored in a volume storage 112 on the server 110. In one embodiment, the volume storage 112 is located at the content provider 102. The volume storage 112 generally includes content from multiple volumes and can serve as a library of digital content. The presentation module 114 accesses the volume storage 112 to present a volume or a portion of a volume to a user. A user can browse and search the volume storage 112 from a client 120 through the presentation module 114.

The content provider 102, client 120, and volume server 110 communicate through a network 108, such as the Internet. FIG. 1 shows only one content provider 102, volume server 110, and client 120, even though there will generally be several of these entities. There may be millions of clients 120 sending queries to the one or more volume servers 110. Certain volume servers 110 may be used for communication with certain content providers 102 or clients 120, and different volume servers 110 may process and store different volume content 104.

As mentioned above, the content provider 102 provides volume content 104 and a content specification 106 describing the volume content to the volume server 110. A single content specification 106 can describe volume content 104 from multiple volumes. Also, multiple content specifications 106 can be used to describe the volume content 104 from a single volume. A content provider 102 is operated by the publisher of the volume content 104, in one embodiment. Some content providers 102 may have a partner agreement with the volume server 110. Content providers 102 that have partner agreements can customize the presentation of their volumes by the presentation module 114 by providing additional customization data, as described below.

Volume content 104 can include portions of a volume stored in graphical image files such as Tagged Image File Format (TIFF) or Joint Photographic Experts Group (JPEG) format, or stored in Portable Document Format (PDF) files, HyperText Markup Language (HTML) files, or text files, for example. Each individual page of a volume can be stored in a separate file, or multiple pages (e.g., a chapter) can be stored in a single file. The content provider 102 may provide multiple versions of a volume, such as a high resolution version that is used for optical character recognition and indexing purposes and a lower resolution version that is used for presenting portions of the volume to users. The volume content 104 is produced, in one embodiment, by scanning pages of printed matter (e.g., a printed book).

Figure 2:
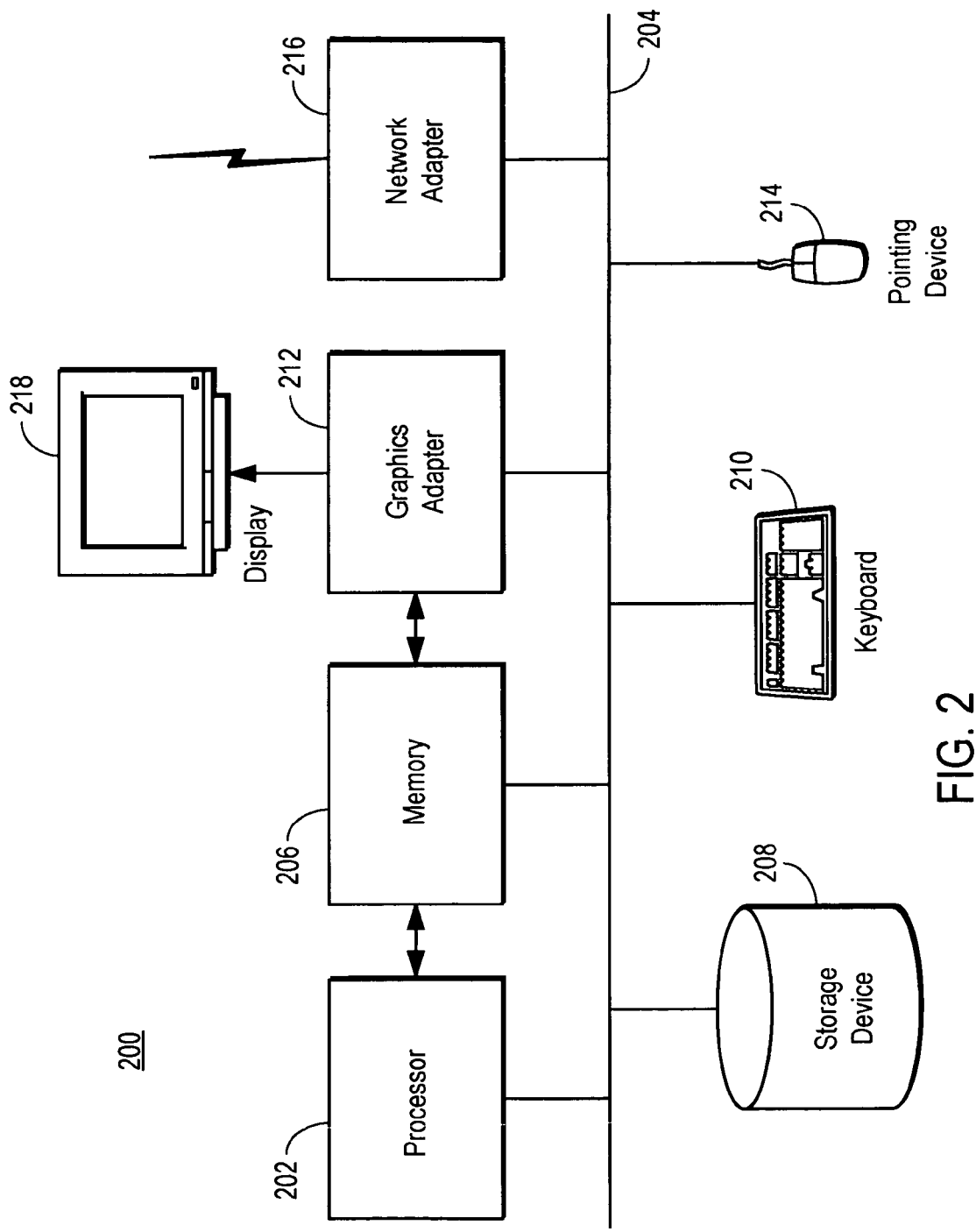
FIG. 2 is a block diagram illustrating a computer that can serve as an embodiment of a content provider, volume server, or client, in one embodiment.

FIG. 2 is a block diagram illustrating a computer 200 that can serve as an embodiment of content provider 102, volume server 110, or client 120, in one embodiment. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 is a device such as a hard drive, CD or DVD drive, or flash memory device, and holds files containing executable code and/or data utilized during the operation of the computer 200. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as a volume server 110 may have greater processing power and a larger storage device than a computer acting as a client 120 or content provider 102. Likewise, a computer 200 acting as a volume server 110 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process.

Figure 3:
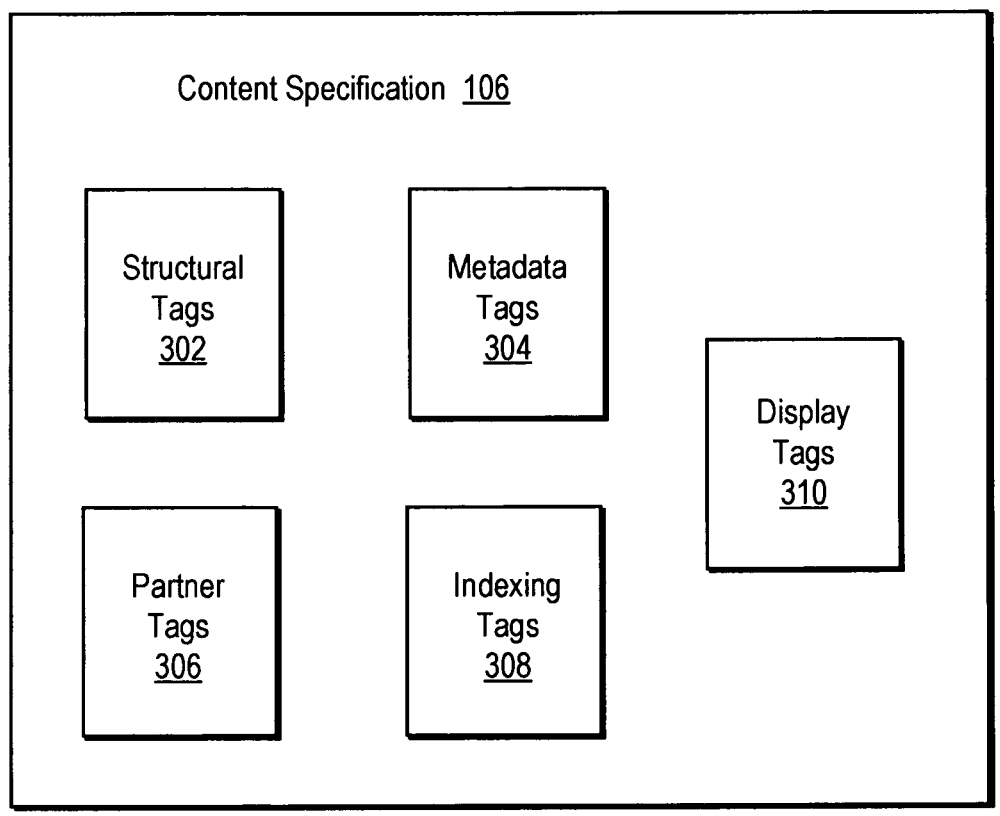
FIG. 3 is a block diagram illustrating the components of a content specification, in one embodiment.

FIG. 3 is a block diagram illustrating the components of a content specification 106, in one embodiment. The content specification 106 contains structural information and metadata about a volume having volume content 104. The structural information can comprise a listing of pages or sections of a volume along with references or pointers to the volume content 104 of those pages or sections. The metadata information is information that describes or identifies the volume or portions of the volume. The information in the content specification 106 is used by the volume server 110 to process and index the volume content 104. The information may also be used to present the volume content 104 to users.

The information from the content specification 106 is less likely to include errors than structural information or metadata obtained from using heuristics and machine learning techniques directly on the volume content 104 because the content specification 106 is created by a content provider 102 who has knowledge about the volume. The content specification 106 may also include information that cannot be obtained from the volume content 104. The information in the content specification 106 can be manually created or verified by a human operator to increase its accuracy.

The content specification 106 is an Extensible Markup Language (XML) file, in one embodiment. It can be generated manually using a text editor, or may be generated using various tools available for creating XML files. Other file formats may also be used. The content specification contains a plurality of markup elements, each element having at least one tag. Tags in the content specification 106 are used to specify information about the volume 104. Tags may be grouped into four main categories: structural tags 302, metadata tags 304, partner tags 306, indexing tags 308, and display tags 310.

Structural tags 302 specify structural information about the volume content 104, enabling the volume content to be located, assembled, and stored in volume storage 112. Structural tags 302 may list the pages of a volume and provide URLs (or other types of references) to files containing volume content 104 of the pages. Structural tags 302 can also be used to describe semantic information about each file comprising the volume content 104. The semantic information can indicate the type of volume content 104 in a file or a relationship between the volume and the volume content in the file (e.g., whether a file contains content for a page, a chapter, or a front cover). Semantic information can indicate that a page is the beginning of chapter 1, or that the page is a table of contents page, or that the page is an advertisement page in a magazine, for example. The semantic information may also indicate relationships between pages, such as a tag indicating that an article on one page is related to an article on another page. Sequence numbers for the files can also be provided using structural tags 302 so that the files can be properly assembled and stored in the volume storage 112.

In one embodiment, images are stored separately from other volume content 104. In this case, structural tags 302 can be used to specify the locations of image files and to specify where the images are to be placed in the assembled volume (e.g., page numbers and positions on pages). As mentioned above, a content specification 106 may contain content from multiple volumes. Structural tags 302 can be used to identify which content files correspond to which volumes. By including references to content files in the content specification 106 through structural tags 302, the volume content 104 can be efficiently retrieved and processed.

Metadata tags 304 are used to specify metadata describing a volume. Metadata tags 304 can be defined and used to specify any information that describes the volume. Examples of volume metadata include: the International Standard Book Number (ISBN), the title, the author, a synopsis, the number of pages in the volume, and the publication year. Metadata can also be included in the content specification 106 using the ONIX format. ONIX is a book publishing standard that includes information commonly used to sort books. Defined ONIX tags include title, author, publication date, and publisher. An ONIX feed can also be referenced from a content specification 106 using a metadata tag 304 provided for referencing the feed. In this case, further metadata is retrieved from the ONIX feed when the content specification 106 is processed.

Partner tags 306 specify partner-specific information in the content specification 106. As mentioned above, some content providers 102 may have a partner agreement that enables them to submit volume content 104 under a partner program. Content submitted under a partner program can be indexed and presented to users with greater customization than non-partner content. Partner tags 306 can be included in a content specification 106 to specify these various customizations.

Partner tags 306 can contain information for identifying a content provider 102 to users when users browse or search a volume from the content provider. A partner tag 306 can specify a publisher website that is displayed to the user so that the user can visit the website and purchase the volume or similar volumes. Partner tags 306 can also specify whether a volume is to be shown to users with advertisements and may contain references to the advertisements to be shown. Partner tags 306 may specify permissions for viewing the volume, such as which users may view the volume, the maximum percentage of the volume that is displayed to a particular user, or whether there is premium content that is available only to subscribers. The terms of such premium content can also be provided in partner tags 306. Partner tags 306 may specify that certain pages of a volume are not viewable to users. Partner tags 306 can specify a layout for showing a volume to users. Partner tags 306 may specify whether the images in a volume can be shown to users and the geographic regions where the volume can be shown. Partner tags 306 may specify that a volume should be searchable through a general web search, a book-specific search, or some other specialized search.

Display tags 310 specify information for displaying the volume to users. Display tags 310 can specify a layout for showing a volume to users. Display tags 310 may also specify certain pages of the volume that are not viewable to users, and can specify other settings for how the volume is to be displayed. As mentioned above, partner tags 306 can include information for displaying the volume to users, similar to display tags 310. Display tags 310 may be used to provide display settings for books that are not part of a partner program.

Indexing tags 308 are included in the content specification 106 to provide additional information for indexing the volume content 104. As mentioned above, the indexed volume is stored in the volume storage 112. Indexing tags 308 can provide indexing instructions for improving the indexing, resulting in better presentation of the volume, including better searching of the volume. In one embodiment, indexing tags 308 specify the granularity for indexing a given volume. For example, an indexing tag may specify whether the volume should be indexed at the page level, chapter level, or volume level. It may be desirable to index volume content 104 representing a cookbook at the page level because the individual recipes are unrelated and each recipe can be searched and presented separately. Similarly, it may be desirable to index volume content 104 representing a textbook at a chapter level because each chapter often covers a single topic.

The following is an example of a portion of the contents of a content specification 106:

```
<bm:volumemap>
    <bm:volume>
    <!-- ONIX metadata URL -->
    <bm:onixMetadataURL>
        <sm:url>
            <sm:loc>http://www.example.com/onix/feed.xml</sm:loc>
        </sm:url>
    </bm:onixMetadataURL>
    <!-- isbn -->
    <bm:identifier type="isbn-13">9780000000000</bm:identifier>
    <!-- content -->
    <bm:resource type="frontcover">
        <bm:contentType format="tif" multipage="false">
            <sm:url>
                <sm:loc>http://www.example.com/book1/frontcover.tif</sm:loc>
                <sm:lastmod>2005-01-01</sm:lastmod>
            </sm:url>
        </bm:content>
        <bm:sequenceNumber>1</bm:sequenceNumber>
        <bm:pageName></bm:pageName>
    </bm:resource>
    <bm:resource type="page">
        <bm:contentType format="plain" multipage="false">
            <sm:url>
                <sm:loc>http://www.example.com/book1/page1.txt</sm:loc>
                <sm:lastmod>2005-01-01</sm: lastmod>
            </sm:url>
        </bm:content>
        <bm:sequenceNumber>2</bm:sequenceNumber>
        <bm:pageName>1</bm:pageName>
    </bm:resource>
    <bm:resource type="page">
        <bm:contentType format="plain" multipage="false">
            <sm:url>
                <sm:loc>http://www.example.com/book1/page2.txt</sm:loc>
                <sm:lastmod>2005-01-01</sm:lastmod>
            </sm:url>
        </bm:content>
        <bm:sequenceNumber>3</bm:sequenceNumber>
        <bm:pageName>2</bm:pageName>
        <bm:excludeFromSearch>true</bm:excludeFromSearch>
    </bm:resource>
... more pages ...
    </bm:volume>
</bm:volumemap>
```

This example content specification 106 includes several structural tags 302 that identify the structure of associated volume content 104. The <bm:volume> tag groups together information about a particular volume. The <bm:resource type> tag indicates the types of the various content files comprising the volume content 104. The types can be, for example, "frontcover", "page", "table of contents", "chapter", etc. The example above includes one front cover and two pages. The location of each content file is identified by a URL using the <sm:url> and <sm:loc> tags as shown. Also, a date of last modification, a sequence number, and a page number is given for each content file. The sequence number is used to provide an overall ordering of the content files while the page number is used to provide a page name for each content file, in one embodiment. As shown above, the first page has a page name of "1" but a sequence number of "2" because it comes after the front cover. The tags describing each content file are nested within the <bm:volume> tag, indicating the hierarchical relationship between the volume and its component content files.

The example content specification 106 includes various metadata tags 304. It includes a <bm:onixMetadataURL> tag referencing an ONIX feed. Further metadata can be acquired from the ONIX feed at the specified URL. The content specification 106 also includes the ISBN of the volume using a <bm:identifier> tag. This ISBN may be used to obtain further metadata about the volume from a database of book data that is indexed by ISBN.

The example content specification 106 also includes a <bm:excludeFromSearch> tag for excluding page 2 of the volume from search results. This is a partner tag 306, in one embodiment. The excluded page is still accessed by the volume server and may be used for indexing the volume, but it is not presented to users by the presentation module 114 as part of the results of a search.

Figure 4:
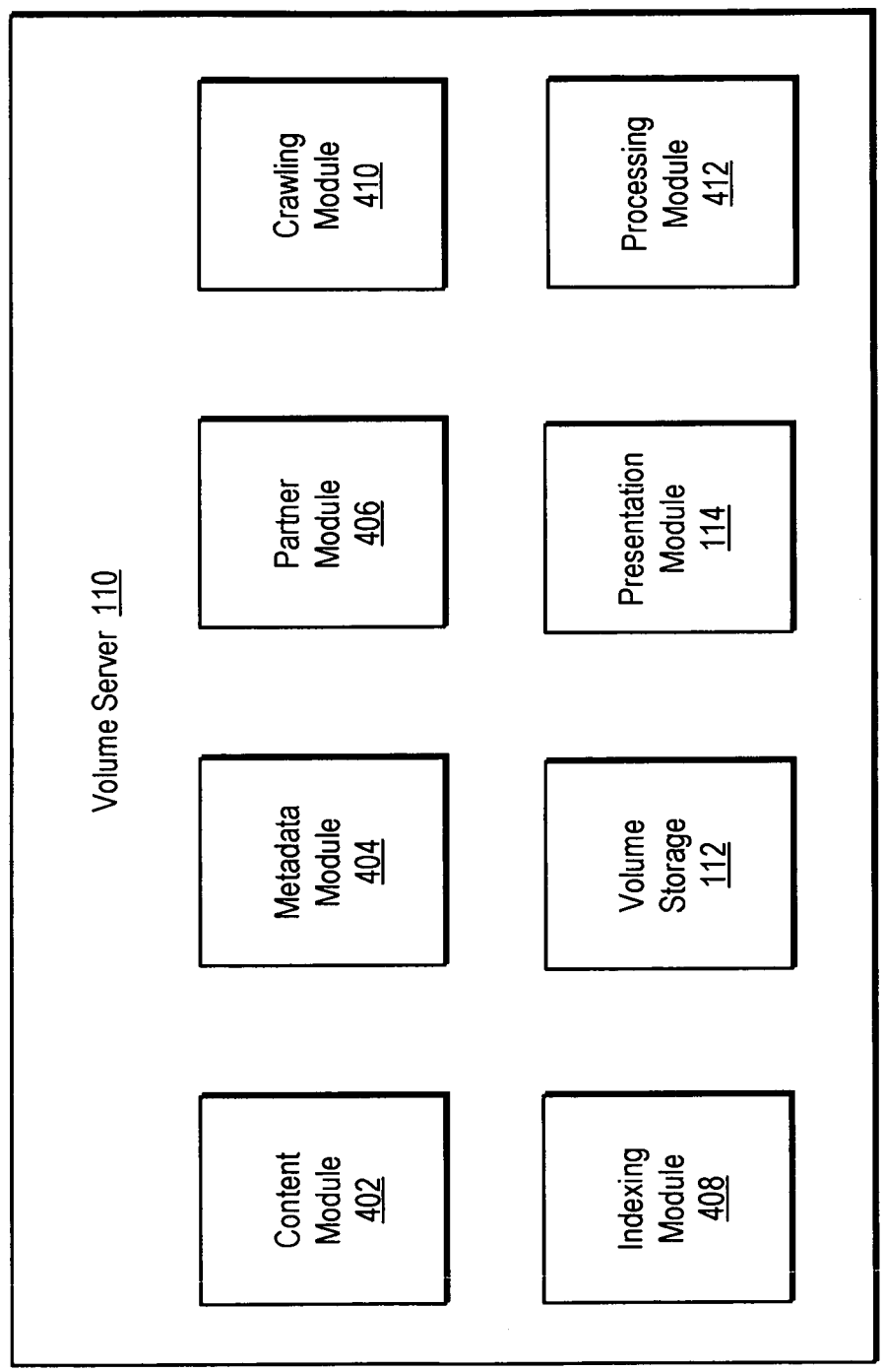
FIG. 4 is a block diagram illustrating the components of the volume server, in one embodiment.

FIG. 4 is a block diagram illustrating the components of the volume server 110, in one embodiment. As mentioned above, the volume server 110 receives volume content 104 and a content specification 106 from a content provider 102. The volume server 110 processes and indexes the volume content 104 and stores the processed content and index in the volume storage 112. The volume storage 112 generally includes content from multiple volumes and can serve as a library of digital content. The presentation module 114 accesses the volume storage 112 to present the volume to users at clients 120.

In one embodiment, the content specification 106 is retrieved by the crawling module 410. The content provider 102 stores the content specification 106 in a location that is accessible to the crawling module 410 and the crawling module finds the content specification while crawling the content provider (e.g., while examining a file system on a storage device of the content provider 102). The crawling module 410 may recognize a particular file as being a content specification 106 by its filename or its file location. The content specification 106 may also be located by a reference from another file previously examined by the crawling module 410. For example, one content specification 106 may include a tag referencing another content specification. In one embodiment, a content specification 106 can be submitted to the volume server 110 by the content provider 102 rather than crawled by the crawling module 410. In this case, an interface is provided by the volume server 110 for uploading the content specification 106. Methods may also be provided for a content provider 102 to modify or remove content specifications 106 previously provided to the volume server 110.

Once received by the volume server, the information in the content specification 106 is extracted and processed by the metadata module 404, the content module 402, the partner module 406, and the indexing module 408. In one embodiment, the content specification 106 is first processed by an XML parser on the volume server 110 and relevant data contained in the XML tags is provided to each of these modules.

The content module 402 retrieves files comprising the volume content 104 based on references (e.g., URLs) to the files in structural tags 302 in the content specification 106, in one embodiment. The content module 402 uses sequencing information in the structural tags 302 to assemble the volume content files in the correct sequence and to store the assembled volume in the volume storage 112. The content module 402 can also retrieve separately stored images and place the images in the assembled volume. As mentioned above, a content specification 106 may describe more than one volume. In this case, the content module 402 separates the referenced volume content 104 into multiple volumes based on information in the structural tags 302.

The content module 402 can attach data to the content stored in the volume storage 112 to identify various portions of the content, such semantic information identifying which parts of the content represent a table of contents or an index of a volume, or data that specifies whether a page of a volume is a low-resolution version intended for presentation to users or a high-resolution version intended for optical character recognition (OCR). The content module 402 may also perform further processing on the content itself, such as converting the content files from a format used by the content provider 102 to a different format for storage in the volume storage 112.

The metadata module 404 processes the metadata information included in the content specification 106 using metadata tags 304, in one embodiment. As mentioned above, a metadata tag 304 may reference an external ONIX feed. This feed can be retrieved and processed by the metadata module 404. In one embodiment, the metadata module 404 uses the metadata provided in metadata tags 304 to obtain further metadata not provided in the content specification 106. For example, an ISBN for the volume may be provided using a metadata tag 304 in the content specification 106. This ISBN can be used by the metadata module 404 to retrieve further volume metadata from a database that stores the metadata of many volumes indexed by ISBN. After processing the metadata tags 304 and retrieving any metadata from other sources, the metadata module 404 stores the metadata in volume storage 112 and associates the stored metadata with related content in the volume storage, in one embodiment.

In one embodiment, the metadata module 404 also processes content stored in the volume storage 112 by the content module 402 to extract metadata from the content. The metadata module 112 may perform optical character recognition (OCR) on the content and apply various heuristics and machine learning techniques on the content to obtain metadata. As described above, this method can be error-prone, but it may be used to augment or verify the metadata provided in metadata tags 304.

The partner module 406 extracts partner-specific information provided in partner tags 306 in the content specification 106, in one embodiment. The partner module 406 initially determines whether the content specification 106 corresponds to volume content 104 submitted under a partner program. This may be done by looking for the presence of partner tags 306 in the content specification 106 or by looking for authentication information in the content specification identifying the content provider 102 as a partner. The partner module 406 extracts information from the partner tags 306 described above and stores this information in the volume storage 112, in one embodiment. This information is then retrieved by the presentation module 114 to customize the presentation of the volume to users.

The indexing module 408 indexes the information in the volume storage 112 that was generated by the content module 402, the metadata module 404, and the partner module 406. In one embodiment, the index created by the indexing module 408 is also stored in volume storage 112. The indexing module 408 performs optical character recognition (OCR) on the content, if necessary, to determine its text and indexes the content based on the text. The indexing module 408 may take into account structural information when indexing the content (e.g., give a heavier weight to pages identified as being part of a Table of Contents). In one embodiment, the indexing module 408 also indexes metadata and partner-specific data. The indexing module 408 can use information provided in the indexing tags 308 to improve the quality of the indexing. For example, the indexing tags 308 may specify a grouping of the content for indexing (e.g., index each page separately or index each chapter separately).

The processing module 412 performs various processing functions required by other modules in the volume server 110, in one embodiment. The processing module 412 can assemble a volume from content files and can convert content files from a format used by the content provider 102 to a different format for storage in the volume storage 112. The processing module 412 can associate metadata with related content in the volume storage 112. The processing module can perform OCR on the volume content 104 and apply various heuristics and machine learning techniques on the content to obtain metadata.

The presentation module 114 accesses the volume storage 112 to present a volume to a user. A user can browse and search the volume storage 112 (which contains data from many volumes) from a client 120 through the presentation module 114. In one embodiment, the presentation module 114 receives a search query from a client 120. The presentation module searches the volume storage 112 using the index created by the indexing module 408 to identify volume content relevant to the query and generates search results. The presentation module sends the search results to the client 120 where they are displayed to a user. A user can choose to view volume content associated with one of the search results. This request is received by the presentation module, which provides the content to the client 120 to be displayed to the user, possibly through a web interface. In one embodiment, the presentation module 114 can be used for browsing volume content. In this case, the presentation module 114 supplies content from the volume storage 112 to a client 120 in response to received browse commands and specifies how to present the content to the user. For example, pages of a digitized book can be displayed on a user's screen so that they appears similar to pages from a printed version of the book. The user may be able to issue commands to navigate the pages of the book.

When presenting volume content, the presentation module 114 can display metadata about the volume obtained from the metadata module 404, such as a title or author of the volume. The presentation module 114 also uses partner-specific information obtained from the partner module 406 for displaying volumes that are part of a partner program. As described above, partner-specific information can specify permissions and layouts for displaying volume content. Partner-specific information can also specify that the volume should appear as search results in certain types of searches (e.g., in a general web search or in a books-specific search). Information for displaying the volume can also be provided for volumes that are not part of the partner program, for example by using display tags 310 as mentioned above.

Figure 5:
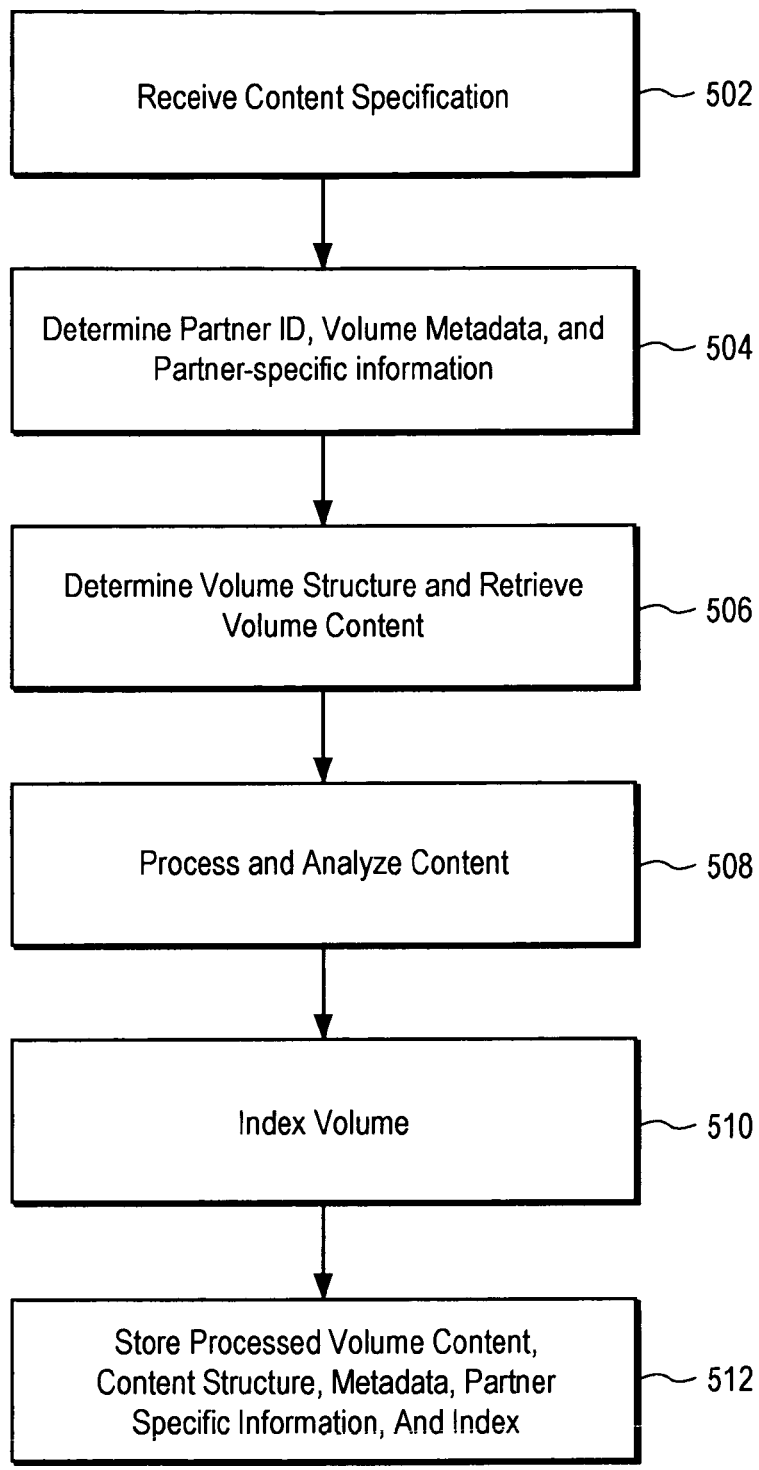
FIG. 5 is a flowchart illustrating a method of processing volume content, in one embodiment.

FIG. 5 is a flowchart illustrating a method of processing volume content 104, in one embodiment. The volume server receives 502 a content specification 106 from the content provider 102. The content specification 106 can be retrieved by the crawling module 410. The partner module 406 determines 504 whether the content specification 106 describes a volume with partner-specific information. If so, the partner module 406 determines 504 a partner identifier and the partner-specific information associated with the volume from the partner tags 306. Additionally, the metadata module 404 determines 504 volume metadata from the metadata tags 304.

The content module 402 uses structural tags 302 in the content specification 106 to determine 506 the structure of a volume and retrieve the volume content 104 files from the content provider 102. The volume content is the processed 508 and analyzed based on the structure of the volume. This processing may include assembling the volume from the volume content 104 files and performing OCR on the volume content. The indexing module 408 indexes 510 the volume based on indexing tags 308 and based on the processed volume content, structural information, metadata, and partner-specific information. The processed volume content, content structure, metadata, partner-specific information, and index is stored 512 in the volume storage 112. The volume storage 112 may be accessed by the presentation module 114 for presentation to users.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer program product having a non-transitory computer-readable storage medium having executable computer program instructions recorded thereon for incorporating a digital volume into a digital library, comprising:
   a module for receiving a content specification for the digital volume, the digital volume having volume content that includes textual data, the content specification comprising:
      a plurality of markup language elements specifying information about the digital volume; and
      a plurality of tags associated with the markup language elements, the plurality of tags comprising:
         a structural tag specifying structural information associated with the digital volume, the structural information comprising a location of at least a portion of the volume content;
         a metadata tag specifying metadata describing the digital volume; and
         an indexing tag specifying a granularity level for indexing the volume content;
   a content module for obtaining the volume content of the digital volume based at least in part on the location of at least a portion of volume content specified in the structural tag; and
   an indexing module for indexing the textual data of the obtained volume content at the granularity level specified by the indexing tag of the content specification.

2. The computer program product of claim 1, further comprising:

a metadata module for obtaining metadata for the digital volume from the metadata tag of the content specification, wherein the indexing is based at least in part on the metadata.

3. The computer program product of claim 1, wherein the content specification further specifies sequencing information indicating a sequence of the portions of volume content, and wherein the content module is further configured for assembling the digital volume from the portions of volume content, the assembling based at least in part on the sequencing information.

4. The computer program product of claim 1, wherein the indexing module is further configured for extracting text from the volume content, the indexing based at least in part on the extracted text.

5. The computer program product of claim 1, further comprising:
a presentation module for receiving a search query and for identifying volume content relevant to the search query based at least in part on the indexed volume content.

6. The computer program product of claim 1, wherein the content specification specifies that the granularity level is at a page level and the indexing module indexes the volume content at the page level.

7. The computer program product of claim 1, wherein the content specification specifies that the granularity level is at a chapter level and the indexing module indexes the volume content at the chapter level.

8. A system, having a processor, for incorporating a digital volume into a digital library, comprising:
a non-transitory computer-readable storage medium storing computer program modules executable on the processor comprising:
a module for receiving a content specification for the digital volume, the digital volume having volume content that includes textual data, the content specification comprising:
a plurality of markup language elements specifying information about the digital volume; and
a plurality of tags associated with the markup language elements, the plurality of tags comprising:
a structural tag specifying structural information associated with the digital volume, the structural information comprising a location of at least a portion of the volume content;
a metadata tag specifying metadata describing the digital volume; and
an indexing tag specifying a granularity level for indexing the volume content;
a content module for obtaining the volume content of the digital volume based at least in part on the location of at least a portion of volume content specified in the structural tag; and
an indexing module for indexing the textual data of the obtained volume content at the granularity level specified by the indexing tag of the content specification.

9. The system of claim 8, further comprising:
a metadata module for obtaining metadata for the digital volume from the metadata tag of the content specification, wherein the indexing is based at least in part on the metadata.

10. The system of claim 8, wherein the content specification further specifies sequencing information indicating a sequence of the portions of volume content, and wherein the content module is further configured for assembling the digital volume from the portions of volume content, the assembling based at least in part on the sequencing information.

11. The system of claim 8, wherein the indexing module is further configured for extracting text from the volume content, the indexing based at least in part on the extracted text.

12. The system of claim 8, further comprising:
a presentation module for receiving a search query and for identifying volume content relevant to the search query based at least in part on the indexed volume content.

13. A computer-implemented method for incorporating a digital volume into a digital library, comprising:
receiving a content specification for the digital volume, the digital volume having volume content that includes textual data, the content specification comprising
a plurality of markup language elements specifying information about the digital volume; and
a plurality of tags associated with the markup language elements, the plurality of tags comprising:
a structural tag specifying structural information associated with the digital volume, the structural information comprising a location of at least a portion of the volume content;
a metadata tag specifying metadata describing the digital volume; and
an indexing tag specifying a granularity level for indexing the volume content;
obtaining the volume content of the digital volume based at least in part on the location of at least a portion of volume content specified in the structural tag; and
indexing the textual data of the obtained volume content at the granularity level specified by the indexing tag of the content specification.

14. The computer-implemented method of claim 13, further comprising:
obtaining metadata for the digital volume from the metadata tag of the content specification, wherein the indexing is based at least in part on the metadata.

15. The computer-implemented method of claim 13, wherein the content specification further specifies sequencing information indicating a sequence of the portions of volume content, and further comprising:
assembling the digital volume from the portions of volume content, the assembling based at least in part on the sequencing information.

16. The computer-implemented method of claim 13, further comprising:
extracting text from the volume content, the indexing based at least in part on the extracted text.

17. The computer-implemented method of claim 13, further comprising:
receiving a search query; and
identifying volume content relevant to the search query based at least in part on the indexed volume content.

18. A non-transitory computer-readable medium encoded with a data structure for describing a digital volume, comprising:
a plurality of markup language elements specifying information about the digital volume; and
a plurality of tags associated with the markup language elements, the plurality of tags comprising:
a structural tag specifying structural information associated with the digital volume, the structural information comprising a location of at least a portion of volume content of the digital volume, the structural information used for obtaining the volume content of the digital volume;

a metadata tag specifying metadata describing the digital volume; and an indexing tag specifying indexing information describing instructions for indexing textual data in the digital volume, the instructions indicating a granularity level for indexing the textual data in the digital volume.

19. The computer-readable medium of claim 18, wherein the structural information further comprises semantic information about the portion of volume content, the semantic information indicating a relationship between the portion of volume content and the digital volume.

20. The computer-readable medium of claim 18, wherein the structural information further comprises a sequence number for the portion of the volume content, the sequence number indicating an ordering of the portion of the volume content relative to other portions of volume content in the digital volume.

21. The computer-readable medium of claim 18, wherein the metadata comprises an international standard book number (ISBN) of the digital volume.

22. The computer-readable medium of claim 18, wherein the metadata comprises a reference to ONIX data describing the digital volume.

23. The computer-readable medium of claim 18, wherein the plurality of tags further comprise:

a partner tag specifying partner-specific information, the partner-specific information comprising permissions for viewing or searching volume content of the digital volume.

24. The computer-readable medium of claim 18, wherein the plurality of tags further comprise:

a partner tag specifying partner-specific information, the partner-specific information comprising a reference to an advertisement for displaying when the volume content of the digital volume is shown to a user.

* * * * *